(12) United States Patent
Alberth et al.

(10) Patent No.: US 8,811,588 B2
(45) Date of Patent: Aug. 19, 2014

(54) METHOD AND SYSTEM FOR MANAGING MULTIPLE SIMULTANEOUSLY PLACED CALLS

(75) Inventors: William P. Alberth, Prairie Grove, IL (US); Dean E. Thorson, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/331,751

(22) Filed: Dec. 20, 2011

(65) Prior Publication Data

US 2013/0156169 A1 Jun. 20, 2013

(51) Int. Cl.
*H04M 3/42* (2006.01)
(52) U.S. Cl.
USPC ..................................... 379/211.04
(58) Field of Classification Search
USPC ............... 379/202.01–206.01, 211.04
See application file for complete search history.

(56) References Cited

U.S. PATENT DOCUMENTS

| | | | |
|---|---|---|---|
| 6,201,856 B1 * | 3/2001 | Orwick et al. | 379/40 |
| 6,324,262 B1 * | 11/2001 | Tuttle | 379/69 |
| 6,850,610 B1 * | 2/2005 | Coleman | 379/215.01 |
| 6,856,806 B1 * | 2/2005 | Bosik et al. | 455/445 |
| 6,973,166 B1 * | 12/2005 | Tsumpes | 379/45 |
| RE41,845 E | 10/2010 | Jenkins | |
| 8,078,155 B2 * | 12/2011 | Linquist et al. | 455/416 |
| 2008/0080692 A1 * | 4/2008 | Sylvain | 379/202.01 |
| 2009/0203350 A1 | 8/2009 | Gottlieb | |

OTHER PUBLICATIONS

NCH Software, Axon Agent, Predictive Dialer for Outbound Calling Campaigns, http://www/nchsoftware.com/, downloaded from Internet: Jun. 6, 2011, all pages.

* cited by examiner

*Primary Examiner* — Simon Sing
(74) *Attorney, Agent, or Firm* — Shumaker & Sieffert, P.A.

(57) ABSTRACT

A method is disclosed, herein, for managing multiple simultaneously placed calls by enabling calling, in parallel and simultaneously, a plurality of parties. An initial answer is detected from one of the plurality of parties and the initial answer is further determined to be from a live person or a machine-operated apparatus, such as an answering machine, voice-mail service. Where the initial answer is from a machine-operated apparatus a pre-recorded message is played; unlike where a live person has been detected. Therein, a live conversation is enabled where the initial answer is determined to be a live person. Finally, the method includes the simultaneous management of the other called parties while the live conversation with the initial live person is occurring.

25 Claims, 5 Drawing Sheets

METHOD AND SYSTEM FOR MANAGING MULTIPLE SIMULTANEOUSLY PLACED CALLS

FIELD OF THE DISCLOSURE

The present disclosure relates generally to a method employing distributed calling in a communication network and more particularly to managing multiple calls in a parallel fashion in an internet protocol multi-media system (IMS).

BACKGROUND

Many persons rely on modern day communication networks to reach out and obtain expert advice, health advice, and emergency care, for example. These sources of information can be wide spread throughout a city, a workplace, a country, or across international boundaries. Conventionally, the commonplace method of reaching numerous experts involved either serially placing or initiating multiple phone calls to the plurality of experts or alternatively, employing a group call with specialized audio processing or phone equipment. The experts would for fee dial into a teleconference established over either secure or non-secure phone lines. A previous message of some sort, for example, an email or calendar item would direct the experts to call into the teleconference. The experts would employ a conference code for access. This method involves a considerable cost to maintain and add likely new users to the conference model.

Accordingly, there is a need for a method and system for managing multiple simultaneously placed calls.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
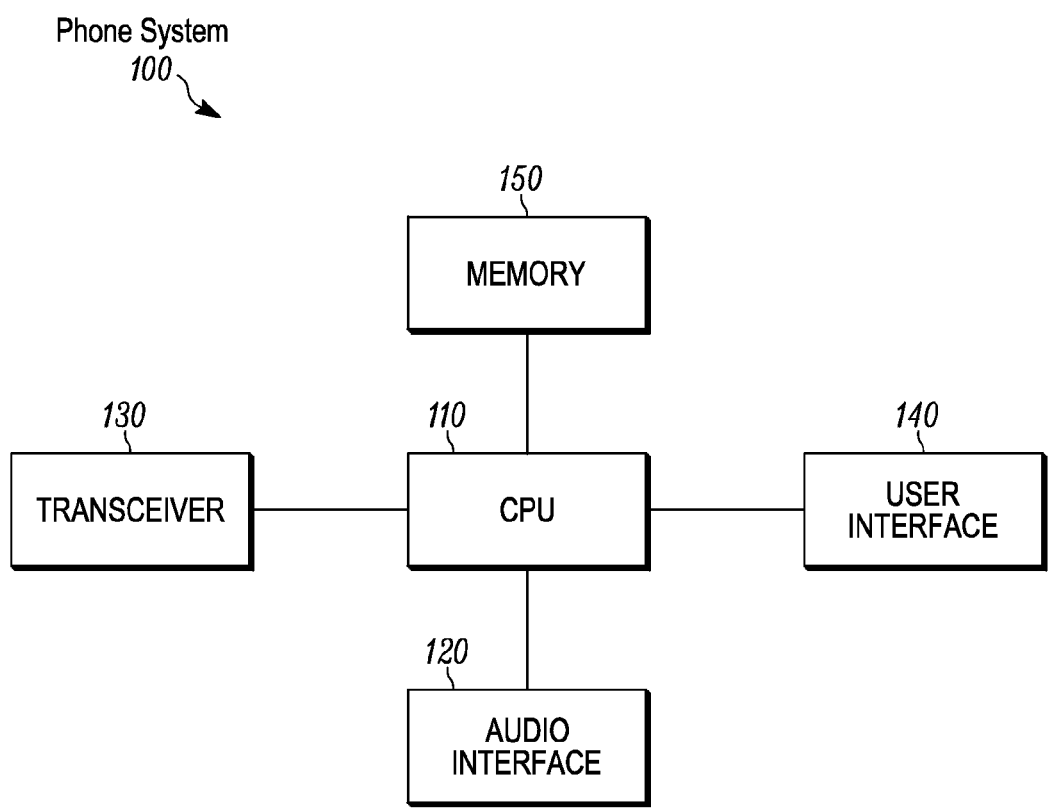
FIG. 1 is a block diagram of an exemplary phone system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method is disclosed, herein, for managing multiple simultaneously placed calls by enabling calling, in parallel and simultaneously, a plurality of parties. An initial answer is detected from one of the plurality of parties and the initial answer is further determined to be from a live person or a machine-operated apparatus, such as an answering machine, voice-mail service, etc. Where the initial answer is from a machine-operated apparatus, a pre-recorded message is played; unlike where a live person has been detected. Therein, a live conversation is enabled where the initial answer is determined to be a live person. Finally, the method includes the simultaneous management of the other called parties while the live conversation with the initial live person is occurring.

FIG. 1 is a block diagram of an exemplary phone system 100 in accordance with one or more embodiments disclosed herein. Every component of a phone system may not be shown to simplify the drawing while recognizing that those skilled in the art of phone systems will readily understand other necessary components useful for enabling operation of a phone system.

FIG. 1 shows a central processing unit (CPU) 110 electrically and communicatively coupled to one or more other components in phone system 100. The CPU 110 can be comprised of one or more processors run by software or non-transitory program code. CPU 110 is coupled to an audio interface 120. Audio interface 120 can include one or more microphones, speakers, vibratory and/or haptic feedbacks.

CPU 110 is also coupled to a transceiver 130 that enables the transmission and reception of communication signals. The communication signals may be provided by one or cellular networks, GSM, CDMA, TDD, near field communication (NFC), Bluetooth, or a Wi-FI network. A user interface 140 can also be coupled to CPU 110, wherein the user interface 140 provides capability for inputting user commands and outputting results via a touchscreen display, for example.

In addition, memory 150 can be coupled to CPU 110 for storing data and results of processing operations. Memory 150 can be one or more external or internal storage areas.

Figure 2:
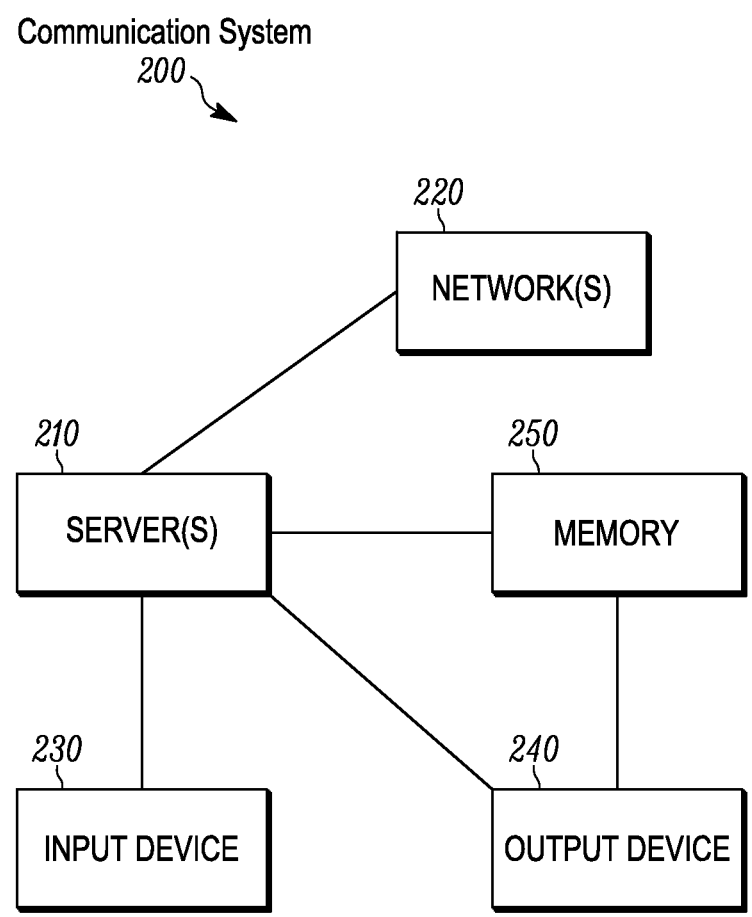
FIG. 2 is a block diagram of an exemplary communication system in accordance with some embodiments.

FIG. 2 is a block diagram of an exemplary communication system 200 in accordance with one or more embodiments disclosed herein. Every component of a communication system may not be shown to simplify the drawing while recognizing that those skilled in the art of communication systems will readily understand other necessary components useful for enabling operation of a communication system.

FIG. 2 shows at least one server 210 configured to run processing operations for the communication system 200. The communication system 200 may employ multiple servers. The server 210 is electronically and communicatively coupled to one or more networks 220. Network 220 can be one or cellular networks, GSM, CDMA, TDD, near field communication (NFC), Bluetooth, or a Wi-FI network.

Server 210 is also electrically and communicatively coupled to at least input device 230 and at least one output device 240. Input device 230 may include a keyboard or a touchscreen, while output device 240 may include a speaker or display screen.

At least one memory component 250 is coupled to server 210. Memory 250 stores data and results of processing operations. Memory 250 can be one or more external or internal storage areas.

Figure 3:
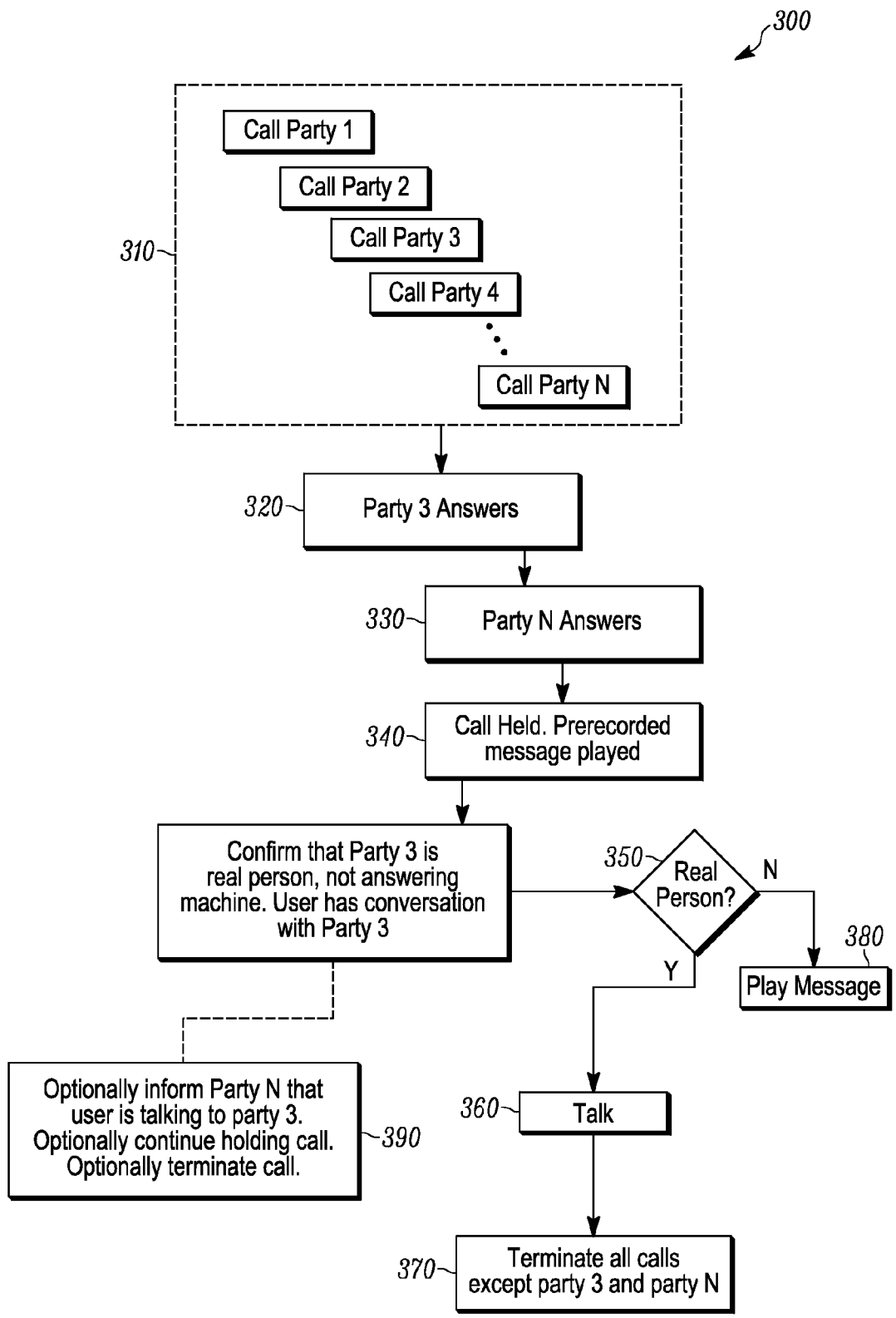
FIG. 3 is a flowchart of an exemplary method of managing multiple and simultaneous calls in accordance with one embodiment.

FIG. 3 is a flowchart of an exemplary method 300 of managing multiple and simultaneous calls in accordance with one embodiment. One or more of the operations may happen at the same time. Operation 310 makes parallel and simultaneous calls to multiple parties. In operation 320, one of the multiple parties that were called answers the call first and is considered temporarily the initial answerer. In operation 330, another called party, Party N, answers the call. Operation 340 holds the call of Party N and plays a pre-recorded message detailing that to Party N that the user is talking to another at the moment, but that Party N is requested to hold for further information. The pre-recorded message may contain details of the reason the call is being placed, the identity of the caller, or other information that will provide incentive for party N to stay connected to the call.

At or about the same time, an inquiry by Operation 350 determines whether the temporary initial answerer is in fact a live or real person versus an answering machine or voice mail service apparatus. If it can be confirmed or determined that the temporary initial answerer is indeed a real live person, then operation 360 commences to speak directly with the newly determined initial answerer. During the phone call or conversation with the initial answerer (herein party 3), operation 370 terminates other multiple placed calls except call with party N, the other answered party.

Where it cannot be confirmed or determined that the temporary initial answerer is indeed a real live person, operation 380 plays a pre-recorded message for the apparatus. Operation 390 optionally informs party N that individual user of communication system 200 or phone system 100 (as shown in FIGS. 2 and 1, respectively) is talking to party 3, the initial answerer. Alternatively, operation 390 may enable the continued holding of the phone call with party N or may terminate the call with party N.

Figure 4:
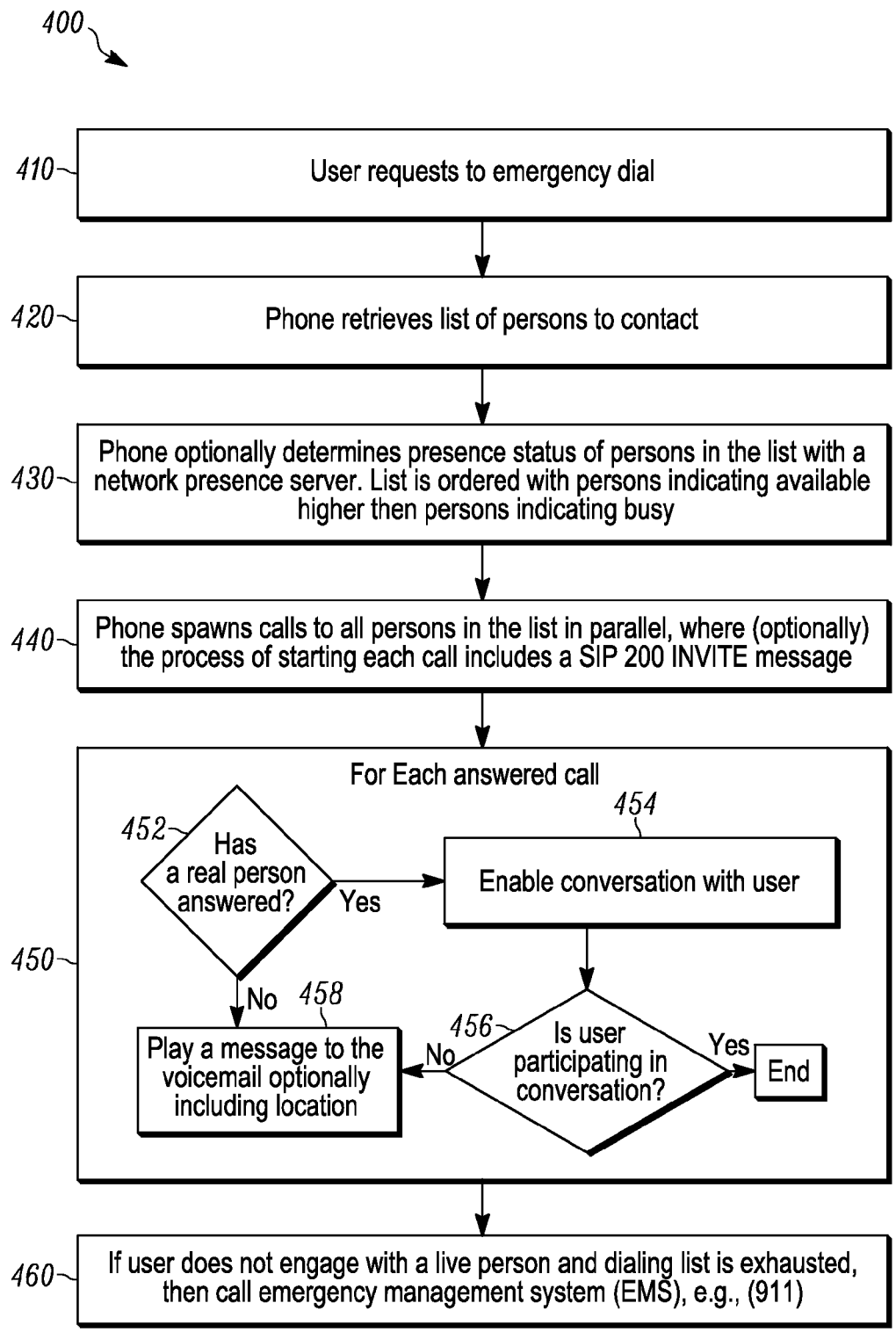
FIG. 4 is another flowchart of an exemplary method of managing multiple and simultaneous emergency calls in accordance with another embodiment.

FIG. 4 is another flowchart of an exemplary method 400 of managing multiple and simultaneous emergency calls in accordance with another embodiment. In operation 410, an individual user requests the phone or mobile communication device to place or dial an emergency call. Operation 420 retrieves a list of emergency contacts from within or external to the phone or mobile communication device.

In operation 430, the phone (i.e., smartphone) or mobile communication device optionally determines presence status of persons or contacts within the emergency contacts list via a network presence server. The emergency contacts list may ordered or arranged in such way that available persons as determined by their presence status can have a higher priority than persons determined to be unavailable or busy. Operation 440 causes the phone to dial all persons in the emergency contact list in parallel or all at once. In addition, the dialing process may include sending a session internet protocol (SIP) 200 invite message with the start of each dialed phone call.

Operation 450 includes an internal process or method for each answered phone call. Notably, sub-operation 452 inquires or determines whether a real, live person has answered the dialed phone call. An affirmative answer to sub-operation 452, yields sub-operation 454, where a live conversation between the answerer and the phone user is enabled. Another inquiry by operation 456 determines whether the phone user is participating in the enabled conversation. If not, then operation 453 plays a message to the voicemail apparatus and optionally may include the location of phone user. Likewise, where operation 452 determines that no real, live person has answered the phone call, operation 453 plays a message to the voicemail apparatus and optionally may include the location of phone user. Where operation 456 determines that the phone user is participating in the conversation with the answerer of the phone call, the process is completed.

Alternatively, operation 460 provides that if a user does not engage with a live person and the emergency dialing list is exhausted, then local emergency call service is dialed (e.g., 911 in the United States).

Figure 5:
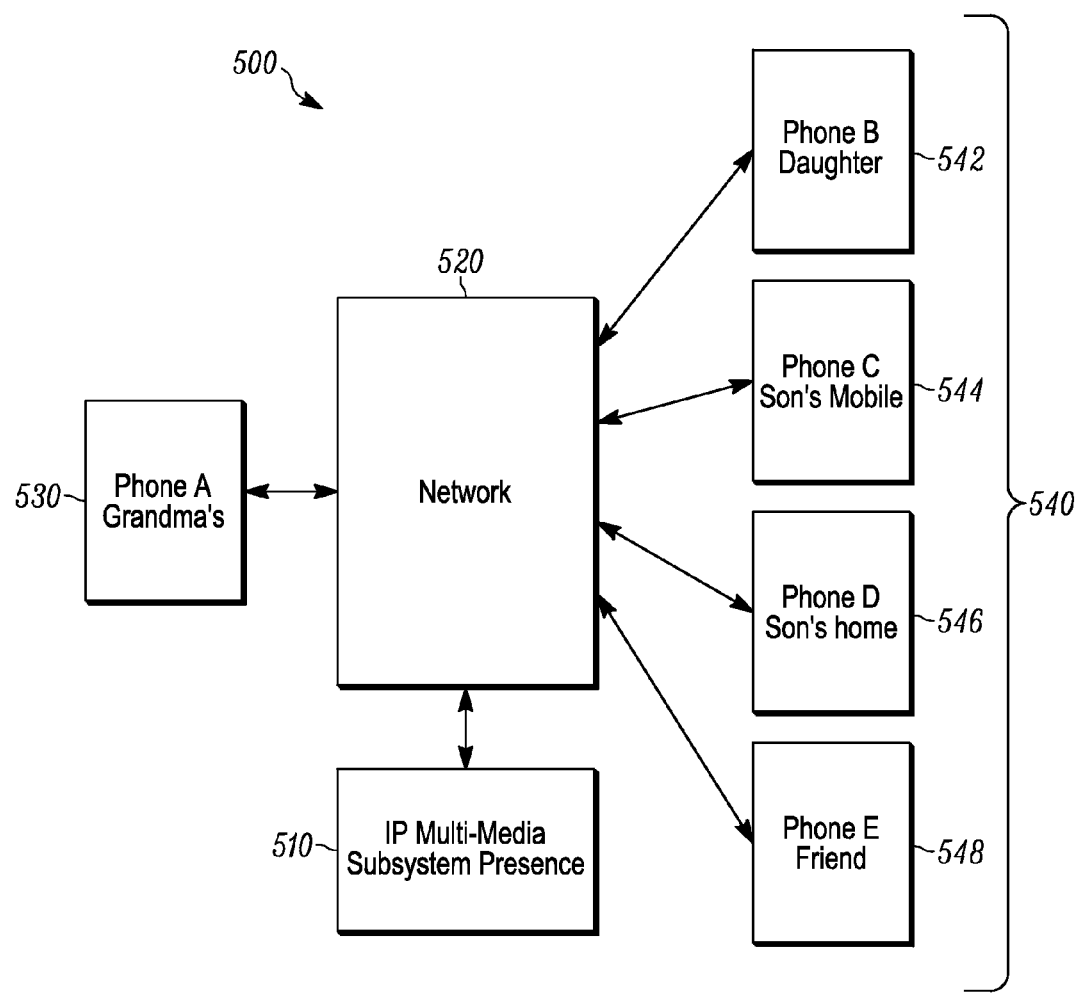
FIG. 5 is a schematic of an exemplary distribution of phone calls in accordance with some embodiments.

FIG. 5 is a schematic of an exemplary distribution 500 of phone calls in accordance with some embodiments. Specifically, presence function 510 is a network function provided in internet protocol multi-media system (IMS) for announcing that a contact is present and connected on the network. Accordingly, the IMS system is able to eliminate un-connected devices prior to actually attempting the dialing of the phone calls. Therefore, presence function 510 is coupled to network 520.

A user 530 has his phone electrically and communicatively coupled to the network 520. The user has several emergency contacts either stored in his phone or on the network. The network enables or is configured to place a parallel multiparty phone call 540 to at least several of the listed emergency contacts of user 530. The individual contacts include contact 542, contact 544, contact 546, and contact 548.

Accordingly, one individual can dial a group at the same time, thereby advantageously receiving a fast response from at least one member of the group; that is faster than a serial dialing process could yield. Additionally, the size of the conversation with the group can be managed as well due to pre-determined priority. The method may also optionally provide a status message and a connected state of call message, (that is who answered the phone call first). The method also can provide propagation of the next number to the top of the list, if an answering machine is determined to be connected to the system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing multiple simultaneously placed calls, comprising the steps of:
    a. enabling calling, in parallel and simultaneously, a plurality of parties;
    b. detecting an initial answer and a subsequent answer from an initial party and a subsequent party, respectively;
    c. placing the subsequent party on hold while determining whether the initial answer is from a live person or a machine-operated apparatus;
    d. playing a pre-recorded message to the initial party when the initial answer is from a machine-operated apparatus;
    e. determining whether the subsequent answer is from a live person or an other machine-operated apparatus and;
    f. enabling a live conversation with the subsequent party when the subsequent answer is from the live person.

2. The method claimed in claim 1, wherein the pre-recorded message includes subject matter of the purpose of the call.

3. The method claimed in claim 1, wherein the pre-recorded message includes connected state of the call.

4. The method claimed in claim 1, further comprising:
    enabling the live conversation with the initial party when the initial answer is from the live person.

5. The method claimed in claim 1, further comprising:
    repeating the step of determining whether an answer is from the live person or the machine-operated apparatus with other called parties until the answer from the live person is determined from at least one of the plurality of parties.

6. The method claimed in claim 1, further comprises managing other called parties simultaneously while the live conversation with the subsequent party is occurring.

7. The method claimed in claim 6, wherein managing the other called parties further comprises forwarding a pre-recorded message to the other called parties.

8. The method claimed in claim 7, wherein the pre-recorded message includes subject matter of the purpose of the call.

9. The method claimed in claim 7, wherein the forwarded pre-recorded message includes connected state of the call.

10. The method claimed in claim 6, wherein managing the other called parties further comprises maintaining a communication connection with the other called parties.

11. The method claimed in claim 6, wherein managing the other called parties further comprises terminating a communication connection with the other called parties.

12. A method for managing multiple simultaneously placed calls, comprising the steps of:
    a. in response to an emergency call initiation, enabling calling, in parallel and simultaneously, a plurality of parties;
    b. detecting an initial answer and a subsequent answer from an initial party and a subsequent party, respectively, the subsequent answer while the connection associated with the initial answer is still active;
    c. determining whether the initial answer is from a live person or a machine-operated apparatus;
    d. playing a pre-recorded message to the initial party when the initial answer is from a machine-operated apparatus;
    e. determining whether the subsequent answer while the prerecorded message is played to the first device is by a live person or an other machine-operated apparatus; and
    f. playing another prerecorded message while waiting to enable a live conversation with the subsequent party when the subsequent answer is by the live person.

13. The method claimed in claim 12, wherein the pre-recorded message includes location information.

14. The method claimed in claim 12, further comprising the step of determining presence status of the plurality of parties, and preferentially placing calls to parties with a presence status that indicates availability.

15. The method claimed in claim 12, wherein the pre-recorded message includes connected state of the call.

16. The method claimed in claim 12, further comprising: enabling the live conversation with the initial party when the initial answer is from the live person.

17. The method claimed in claim 12, further comprising: repeating the step of determining whether an answer is from the live person or the machine-operated apparatus with other called parties until the answer from the live person is determined.

18. The method claimed in claim 12, further comprises managing other called parties simultaneously while the live conversation with the subsequent party is occurring.

19. The method claimed in claim 18, wherein the step of managing the other called parties further comprises forwarding a pre-recorded message to the other called parties.

20. The method claimed in claim 18, where the step of managing the other called parties includes informing the other parties that the user is in a conversation.

21. The method claimed in claim 20, wherein managing the other called parties further comprises informing the other parties of the identity of the initial live person.

22. A system for managing a user's multiple simultaneously placed calls, comprising:
   a) a telecommunications network coupled to a presence function for determining presence status of a plurality of parties;
   b) at least one server for enabling calling, in parallel and simultaneously, the plurality of parties, detecting an initial answer and a subsequent answer from an initial party and a subsequent party, respectively, placing the subsequent party on hold while determining whether the initial answer is from a live person or a machine-operated apparatus, playing a pre-recorded message to the initial party when the initial answer is from a machine-operated apparatus, determining whether the subsequent answer is from a live person or the machine-operated apparatus and enabling a live conversation with the subsequent party when the subsequent answer is from the live person associated with the subsequent answer; and
   c) a memory device for storing a pre-recorded message, wherein the pre-recorded message is forwarded to the other called parties.

23. The system claimed in claim 22, wherein the telecommunications network informs other called parties that the user is in a conversation.

24. The system claimed in claim 22, wherein the pre-recorded message includes connected state of the call.

25. A method of multiple call generation from a single mobile communication device to a plurality of communication devices, the method comprising:
   initiating, by the mobile communication device, calling in parallel and simultaneously, to the plurality of communication devices;
   playing a first pre-recorded message to a first one of the plurality of devices to answer when an initial answer from the first one of the plurality of devices to answer is determined to be machine-operated, else, enabling a live conversation using the first one of the plurality of devices to answer when the initial answer is determined to be by a live person;
   determining whether a second answer by a second one of the plurality of device to answer is machine-operated or by a live person, when the second answer is received during the live conversation using the first one of the plurality of devices to answer; and
   playing to the second one of the plurality of devices to answer a second pre-recorded message different from the first pre-recorded message, when the second answer is received during the live conversation using the first one of the plurality of devices to answer.

* * * * *